United States Patent [19]
Shoji et al.

[11] Patent Number: 6,057,969
[45] Date of Patent: May 2, 2000

[54] LENS BARREL

[75] Inventors: Masao Shoji; Osamu Inaba, both of Saitama-ken, Japan

[73] Assignee: Fuji Photo Optical Co., Ltd., Saitama-ken, Japan

[21] Appl. No.: 09/208,746

[22] Filed: Dec. 10, 1998

[30] Foreign Application Priority Data

Dec. 11, 1997 [JP] Japan .................................. 9-341248

[51] Int. Cl.⁷ ................................................ G02B 15/14
[52] U.S. Cl. ............................................................ 359/694
[58] Field of Search .................................. 359/694, 703, 359/704, 822, 557

[56] References Cited

U.S. PATENT DOCUMENTS 5,642,223   6/1997   Hasushita et al. ...................... 359/557
5,926,316   7/1999   Sugawara .................................. 359/557

FOREIGN PATENT DOCUMENTS 8-327869   12/1996   Japan .

*Primary Examiner*—Ricky Mack
*Attorney, Agent, or Firm*—Nixon Peabody LLP; Donald R. Studebaker

[57] ABSTRACT

A lens barrel comprises a first lens group and a second lens group. One of the first lens group and the second lens group is mounted on a lens barrel body with an adjusting mechanism for lens axis deviation intervening therebetween. The other set of lens is mounted on the lens barrel body with an adjusting mechanism for lens inclination intervening therebetween. Adjustments for axis deviation and inclination of the lenses are thereby facilitated.

3 Claims, 2 Drawing Sheets

LENS BARREL

BACKGROUND OF THE INVENTION

1. Field of the Invention

This invention relates to a lens barrel. This invention particularly relates to a lens barrel improved such that lens position adjustments can be carried out easily.

2. Description of the Prior Art

In wide angle zoom lenses comprising a front lens group and a rear lens group, such that reduction in inherent ratio of brightness of an edge of an image field may be restricted, constitutions are often employed, wherein the front lens group is constituted of two sets of lenses, and a shutter blade is located between the two sets of lenses.

Ordinarily, in lens barrels, it is necessary that lens position adjustments be carried out for eliminating deviations in lens positions, such as axis deviation and inclination. Particularly, as for zoom lens barrels in which the front lens group comprises two sets of lenses, it is difficult to obtain desired optical performance by merely connecting and supporting the two sets of lenses with a mechanical means. Therefore, ordinarily, lens position adjustments must be carried out.

As lens barrels aiming at facilitating the lens position adjustments, several lens barrels, such as a lens barrel disclosed in, for example, Japanese Unexamined Patent Publication No. 8(1996)-327869, have heretofore been known. However, heretofore, considerable time and labor have been required to carry out the lens position adjustments.

SUMMARY OF THE INVENTION

The primary object of the present invention is to provide a lens barrel comprising two sets of lenses and a shutter blade located at an intermediate position, wherein adjustments for axis deviation and inclination of the lenses are facilitated.

The present invention provides a lens barrel comprising a first lens group and a second lens group (as in, for example, a wide angle zoom lens), wherein one of the first lens group and the second lens group is mounted on a lens barrel body with an adjusting mechanism for lens axis deviation intervening therebetween, and the other set of lens is mounted on the lens barrel body with an adjusting mechanism for lens inclination intervening therebetween.

With the lens barrel in accordance with the present invention, the adjustment for lens axis deviation can be carried out with respect to one of the first lens group and the second lens group. Also, with respect to the other set of lens, the adjustment for lens inclination can be carried out independently. Since the adjustment for lens axis deviation and the adjustment for lens inclination can be carried out independently, the operations for the lens position adjustments can be carried out easily.

Basically, the adjustment for lens inclination becomes impossible with respect to one of the first lens group and the second lens group, and the adjustment for lens axis deviation becomes impossible with respect to the other set of lenses. However, in cases where, for example, the first lens group and the second lens group constitute a front lens group of a zoom lens, if lens axis deviation of one of the first lens group and the second lens group is adjusted to fall within an allowable range and lens inclination of the other set of lens is adjusted to fall within an allowable range, optical performance requirement of the lenses as a whole can ordinarily be satisfied, and no problems will occur in practice.

DESCRIPTION OF THE PREFERRED EMBODIMENTS

The present invention will hereinbelow be described in further detail with reference to the accompanying drawings.

Figure 1:
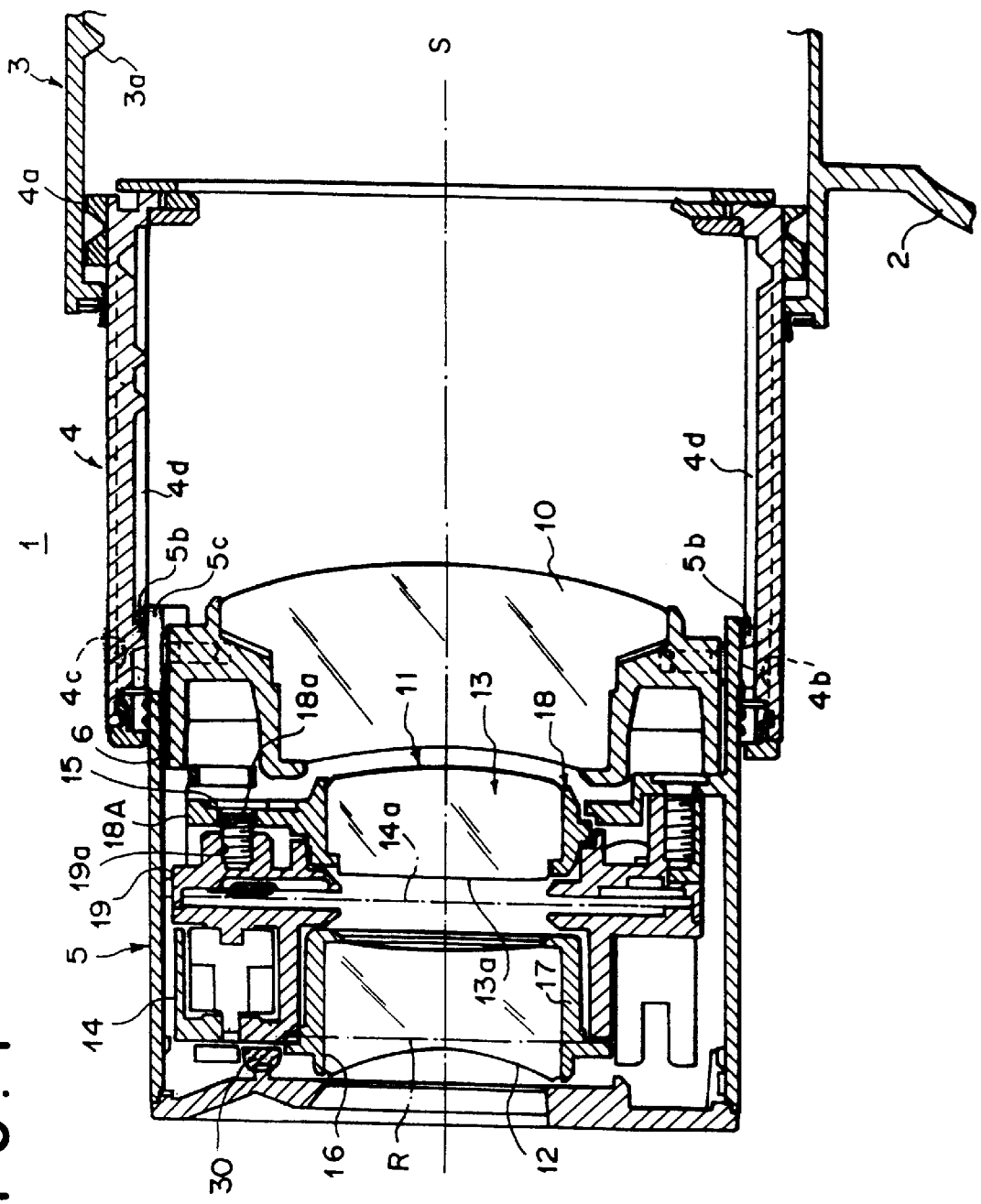
FIG. 1 is a vertical sectional view showing an embodiment of the lens barrel in accordance with the present invention.

FIG. 1 is a sectional view of a zoom lens barrel, which is an embodiment of the lens barrel in accordance with the present invention, the sectional view being taken along a vertical plane containing an optical axis. In FIG. 1, the zoom lens barrel is set in a telescopic state.

With reference to FIG. 1, a zoom lens barrel 1 comprises a secured cylinder 3, which is secured to a camera body 2, and an intermediate cylinder 4, which is located on the side inward from the secured cylinder 3 and co-axially therewith. The intermediate cylinder 4 is engaged with the secured cylinder 3 through helicoids. The zoom lens barrel 1 also comprises a movable cylinder 5, which is located on the side inward from the intermediate cylinder 4 and co-axially therewith. The zoom lens barrel 1 further comprises a rear lens group holder 6.

A male helicoid 3a is formed on the inner circumferential surface of the secured cylinder 3. Also, a female helicoid 4a is formed on the outer circumferential surface of the intermediate cylinder 4. The female helicoid 4a of the intermediate cylinder 4 is engaged with the male helicoid 3a of the secured cylinder 3. Two independent cam grooves 4b and 4c, each of which has a shape constituting a portion of a spiral, are formed on the inner circumferential surface of the intermediate cylinder 4. The movable cylinder 5 and the rear lens group holder 6 are provided with mechanisms for engaging with the cam grooves 4b and 4c.

Further, key grooves 4d, 4d are formed on the inner circumferential surface of the intermediate cylinder 4. The key grooves 4d, 4d extend along the longitudinal direction of the intermediate cylinder 4, i.e. along the direction parallel to an optical axis S. The movable cylinder 5 is provided with keys 5b, 5b. The keys 5b, 5b of the movable cylinder 5 are engaged with the key grooves 4d, 4d. Rotations of the movable cylinder 5 and the rear lens group holder 6 with respect to the intermediate cylinder 4 are restricted, and only the linear movements of the movable cylinder 5 and the rear lens group holder 6 along the optical axis S are possible.

Therefore, when the intermediate cylinder 4 is rotated by a drive means (not shown), the intermediate cylinder 4 protrudes from or retreats into the secured cylinder 3. Also, the movable cylinder 5 and the rear lens group holder 6 move along the optical axis S while the positions are being changed relatively.

A rear lens group 10 is supported by the rear lens group holder 6. Also, a front lens group 11 is supported by the movable cylinder 5. The front lens group 11 comprises an A-set lens 12, which serves as the first lens group located on the front side, and a B-set lens 13, which serves as the second lens group located on the rear side. A shutter blade 14a is located between the A-set lens 12 and the B-set lens 13. The shutter blade 14a is driven by an actuator, which is contained in a shutter block 14 secured to the movable cylinder 5.

The A-set lens 12 is supported by a lens holder 16. The lens holder 16 is mounted on a reference plane R of a mounting member 17, which is combined integrally with the movable cylinder 5. The B-set lens 13 is supported by a lens holder 18. The lens holder 18 is mounted on a mounting member 19, which is combined integrally with the movable cylinder 5.

Figure 2:
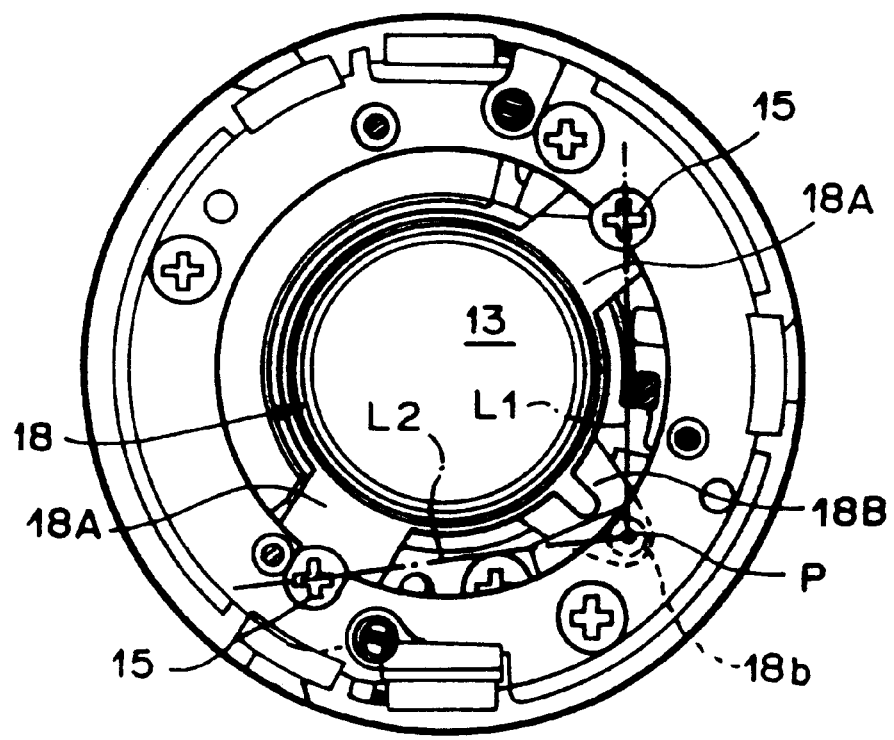
FIG. 2 is a front view showing part of the embodiment of FIG. 1.

FIG. 2 shows the region in the vicinity of the lens holder 18, as viewed from the rear side, i.e. from the side of the rear lens group 10. The embodiment of the lens barrel will hereinbelow be described with reference to FIGS. 1 and 2. The lens holder 18 is provided with two arms 18A, 18A, which extend approximately radially outwardly from the lens holder 18, and an arm 18B. Each of the arms 18A, 18A has a through hole 18a. The arm 18B is provided with an approximately hemispherical boss 18b, which serves as a fulcrum and is projected toward the mounting member 19. The mounting member 19 has two threaded holes 19a, 19a. The boss 18b of the lens holder 18 is brought into contact with a portion of the mounting member 19 from a direction approximately parallel to the optical axis S. Also, setscrews 15, 15 are inserted into the through holes 18a, 18a and screwed into the threaded holes 19a, 19a. In this manner, the lens holder 18 is coupled with and secured to the mounting member 19.

In cases where a predetermined level of mechanical processing accuracy is achieved with respect to the lens holder 16, which supports the A-set lens 12, and the mounting member 17, the lens holder 16 is kept in a predetermined orientation when it is mounted on the reference plane R of the mounting member 17. Also, inclination of the A-set lens 12, which is supported by the lens holder 16, falls within an allowable range. Therefore, when the lens holder 16 is mounted, attention may be paid only to lens axis deviation of the A-set lens 12, and the mounting position of the lens holder 16 may be adjusted such that the lens axis deviation may fall within an allowable range.

A counter spring (not shown) is located between the mounting member 19 and the lens holder 18 and at a position in the vicinity of each of the threaded holes 19a, 19a. The lens holder 18 is urged by the counter springs in the direction heading away from the mounting member 19. Therefore, by the adjustment of the extent, to which each of the setscrews 15, 15 is screwed into the corresponding threaded hole 19a, the distance between each of the arms 18A, 18A and the mounting member 19 changes, and the inclination of the lens holder 18 changes with the contact point between the boss 18b and the mounting member 19 serving as the fulcrum. In this manner, inclination of the B-set lens 13 can be adjusted.

The adjustment of the B-set lens 13 with respect to the lens inclination is carried out before the lens holder 16, which supports the A-set lens 12, is mounted on the mounting member 17. The orientation of the B-set lens 13 is adjusted such that the optical axis may be normal to the reference plane R. Specifically, for example, the inclination of a front surface 13a of the B-set lens 13 (i.e., the inclination of the B-set lens 13) can be detected by using a device, e.g. an autocollimator, for measuring optical straightness by irradiating light to the front surface 13a of the B-set lens 13 and detecting the light reflected from the front surface 13a. Therefore, each of the setscrews 15, 15 may be set while the lens inclination is being detected, and the adjustment with respect to the lens inclination may thereby be carried out.

As illustrated in FIG. 2, the two arms 18A, 18A and the arm 18B are located such that a straight line L1, which connects a vertex of the boss 18b (i.e., a contact point P of the boss 18b with respect to the mounting member 19) and a center point of one of the setscrews 15, 15 constituting part of the adjustment means (i.e., the center point of the corresponding threaded hole 18a), and a straight line L2, which connects the vertex of the boss 18b and a center point of the other setscrew 15, may intersect approximately perpendicularly to each other.

Since the arms 18A, 18A and the arm 18B are located in the manner described above, the direction, in which the lens holder 18 inclines when one of the setscrews 15, 15 is rotated, and the direction, in which the lens holder 18 inclines when the other setscrew 15 is rotated, intersect approximately perpendicularly to each other. Therefore, in cases where one of the setscrews 15, 15 is rotated, little inclination occurs with the lens holder 18 in the direction of inclination, which is obtained when the other setscrew 15 is rotated. Accordingly, independent adjustments can be carried out with respect to the inclinations of the lens holder 18 in the two directions.

In the manner described above, independent adjustments can be carried out with respect to the horizontal and vertical lens inclinations. Specifically, for example, the setscrew 15 located on the left side of the boss 18b in FIG. 2 may firstly be rotated, and the adjustment may thereby be carried out such that the horizontal lens inclination may be eliminated. Thereafter, the setscrew 15 located above the boss 18b in FIG. 2 may be rotated, and the adjustment may thereby be carried out such that the vertical lens inclination may be eliminated. In such cases, there is no risk that horizontal lens inclination occurs due to the adjustment with respect to the vertical lens inclination.

The lens holder 16, which supports the A-set lens 12, is mounted on the mounting member 17 with a plurality of setscrews 30, 30, . . . , which are engaged with the mounting member 17. By way of example, through holes (not shown) formed in the lens holder 16, into which the setscrews 30, 30, . . . are respectively inserted, may take on the form of long holes. In this manner, the mounting position of the lens holder 16 in the plane, which is normal to the optical axis S, can be adjusted. The lens axis deviation of the A-set lens 12 can thereby be carried out.

As described above, with the embodiment described above, the adjustment for lens axis deviation can be carried out with respect to the A-set lens 12, which serves as the first lens group, and the adjustment for lens inclination can be carried out independently with respect to the B-set lens 13, which serves as the second lens group. Therefore, the adjustments for lens axis deviation and lens inclination can be carried out easily.

What is claimed is:

1. A lens barrel comprising a first group and a second lens group, wherein one of the lens group and the second lens is mounted on a lens barrel body with an adjusting mechanism for lens axis deviation intervening between the respective lens group and said lens barrel body, and the other of the first and second lens group is mounted on the lens barrel body with an adjusting mechanism for lens inclination intervening between the other lens group and said lens barrel body.

2. A lens barrel comprising a first lens group and a second lens group; one of the first lens group and the second lens group being mounted on a lens barrel body having an adjusting mechanism for lens axis deviation intervening between the respective lens group and said lens barrel body and the other of the first and second lens group is mounted on the lens barrel body having an adjusting mechanism for lens inclination intervening between the other lens group and said barrel body;

wherein a zoom lens barrel comprises a front lens group and a rear lens group and the front lens group of the zoom lens barrel comprises first lens group and the second lens group.

3. A lens barrel comprising a first lens group and a second lens group; one of the first lens group and the second lens group being mounted on a lens barrel body having an adjusting mechanism for lens axis deviation intervening between the respective lens group and said barrel body and the other of the first and second lens group is mounted on the lens barrel body having an adjusting mechanism for lens inclination intervening between the other lens group said lens barrel body;

wherein a shutter blade is located between the first lens group and the second lens group.

* * * * *